(12) United States Patent
Jäger et al.

(10) Patent No.: US 6,516,255 B2
(45) Date of Patent: Feb. 4, 2003

(54) METHOD OF OPERATING A MOTOR VEHICLE, AND MOTOR VEHICLE EQUIPPED TO PERFORM THE METHOD

(75) Inventors: Thomas Jäger, Meckenbeuren (DE); Klaus Henneberger, Bühl (DE); Martin Vornehm, Bühl (DE); Jens Schnäbele, Bühl (DE); Michael Salecker, Stuttgart/Sonnenberg (DE); Holger Stork, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/880,736

(22) Filed: Jun. 13, 2001

(65) Prior Publication Data

US 2002/0111732 A1 Aug. 15, 2002

Related U.S. Application Data

(63) Continuation of application No. PCT/DE99/03907, filed on Dec. 2, 1999.

(30) Foreign Application Priority Data

Dec. 15, 1998 (DE) .......................................... 198 57 711

(51) Int. Cl.$^7$ .......................... B60K 41/04; F16H 61/12
(52) U.S. Cl. .............................. 701/34; 701/54; 701/62
(58) Field of Search ............................... 701/34, 62, 65, 701/82, 87, 92, 54; 477/109; 180/197

(56) References Cited

U.S. PATENT DOCUMENTS

| | | | | |
|---|---|---|---|---|
| 4,635,508 A | * | 1/1987 | Tatsumi | 477/125 |
| 4,682,667 A | * | 7/1987 | Hosaka | 123/333 |
| 4,750,385 A | * | 6/1988 | Yamamoto et al. | 477/906 |
| 4,969,695 A | * | 11/1990 | Maehata et al. | 303/122.06 |
| 5,018,595 A | * | 5/1991 | Hara et al. | 123/332 |
| 5,343,396 A | * | 8/1994 | Youngblood | 303/122.07 |
| 5,587,905 A | | 12/1996 | Yesel et al. | |
| 5,669,849 A | * | 9/1997 | Tabata et al. | 477/102 |
| 5,729,476 A | * | 3/1998 | Pfau | 303/122.06 |
| 5,819,585 A | | 10/1998 | Darnell | |
| 5,922,038 A | * | 7/1999 | Horiuchi et al. | 303/122.05 |
| 6,009,967 A | * | 1/2000 | Hrovat | 180/197 |

FOREIGN PATENT DOCUMENTS

| | | |
|---|---|---|
| DE | 195 04 847 | 2/1995 |
| EP | 0 711 678 A2 | 5/1996 |
| GB | 2 302 927 A | 2/1997 |

\* cited by examiner

Primary Examiner—Michael J. Zanelli
(74) Attorney, Agent, or Firm—Darby & Darby

(57) ABSTRACT

A method of operating a motor vehicle that is equipped with sensors to detect the rpm-rates of the driven wheels includes the steps of:
  a) determining current rpm-rates of one or more driven wheels;
  b) examining the current rpm-rates for potential errors;
  c) detecting whether a command for a gear shift has been initiated; and
  d) in case an error was found in step b), taking protective measures so that the engine cannot be forced to run at rpm-rates detrimental to the safe operation of the vehicle as a consequence of executing and completing the gear shift.

86 Claims, 5 Drawing Sheets

METHOD OF OPERATING A MOTOR VEHICLE, AND MOTOR VEHICLE EQUIPPED TO PERFORM THE METHOD

CROSS-REFERENCE TO RELATED CASES

This application claims the priorities of the commonly owned German patent application Serial No. 198 57 711.7 filed Dec. 15, 1998 and a continuation of International patent application Ser. No. PCT/DE99/03907 filed Dec. 2, 1999. The disclosures of the above-identified priority applications, as well as those of all U.S. and foreign patents and patent applications identified in the specification of the present application, are incorporated herein by reference.

BACKGROUND OF THE INVENTION

The invention relates to a method of operating a motor vehicle that is equipped with devices that detect the rates of rotation of some or all of the wheels of the vehicle and it also relates to a motor vehicle that is appropriately equipped to perform the inventive method.

Methods of operating a motor vehicle where the rpm-rates of some or all of the wheels are taken into account are known in the existing state of the art.

In a known method of this kind, the rpm-rates of the driven wheels are detected by an arrangement of sensors. The sensor signals are transmitted to a control unit in which the rpm-values are processed and used to regulate or monitor certain parameters of the motor vehicle. For example, the rpm-rates of the wheels may be used to calculate the vehicle speed, at least as long as none of the wheels are slipping on the pavement. Furthermore, by correlating the rpm-rates of the driven wheels with the rpm-rate of the engine of the vehicle, it is possible to find the presence and/or the extent of slippage in the clutch or another torque transmitting system in the power train of the motor vehicle.

Methods of operating a motor vehicle that include detecting and processing the rpm-rates of the vehicle wheels provide a relatively simple way of determining a number of different kinds of instant, real-time data that are helpful in ensuring a reliable operation of the motor vehicle.

However, the methods of the known state of the art suffer from the drawback that they can produce erroneous data. Furthermore, if the erroneous data are used to determine other data such as operating or control parameters, there is a risk that the erroneous data may cause operating errors. Erroneous data and, as a consequence, operating errors can occur, e.g., if at any time the rpm-rates of the wheels as signaled by the rpm sensors are different from the actual rpm-rates, or if at any time the wheel rpm-rates signaled by the rpm sensors do not correlate correctly with other parameters such as the travel speed of the vehicle.

As an example, under certain operating conditions when the transmission is in gear, the input rpm-rate of the transmission can be calculated by multiplying the transmission ratio, the differential ratio, and one-half of the sum of the rpm-rates of the driven wheels. However, if one of the values entering into the calculation is incorrect (e.g., due to a failure of an rpm sensor), the control unit would calculate an incorrect value for the input rpm-rate of the transmission. The error can be further propagated through the power train system, if the input rpm-rate of the transmission is used to determine additional parameters. However, even if the rpm-rates of the wheels have been determined accurately, a control unit in a known state-of-the-art motor vehicle may calculate incorrect values, e.g., if an actual relationship between one or more rpm-rates and one or more calculated values temporarily deviates from the assumed theoretical relationship on which the calculation is based. For example, if the travel speed of the motor vehicle is calculated on the basis of the wheel rpm-rates, the calculated vehicle speed will be inaccurate if any of the wheels are either spinning or locked-up so that they are slipping rather than rolling on the pavement.

Errors in the determination of wheel rpm-rates and/or a faulty calculation of parameters based on the wheel rpm-rates can have a number of adverse effects on the safety and performance of the motor vehicle. For example, the fuel consumption of the vehicle may increase out of the normal range. There is also a risk that certain components of the vehicle may wear excessively or prematurely, and/or that the vehicle may have an increased probability of accidents.

OBJECTS OF THE INVENTION

The present invention therefore has the object of providing a method of operating a motor vehicle that is distinguished from previously known methods in that:

the inventive method will make the motor vehicle safer to operate;

it will in particular improve accuracy and reliability in the detection and processing of operating parameters and control parameters;

it will reduce the fuel consumption of the motor vehicle, while offering at the same time a higher degree of protection against abnormal wear or destruction of components; and in addition to the foregoing distinctive advantages, the method will be compatible with a cost-effective and uncomplicated manufacturing process of the vehicle.

The invention further has the object of providing a motor vehicle that is equipped to perform the inventive method.

SUMMARY OF THE INVENTION

As a solution to the first of the foregoing objectives, the invention proposes an improved method of operating a motor vehicle that is equipped with a drive source producing a driving torque, a clutch or other torque-transmitting device, a transmission, an arrangement of one or more rpm sensors to detect rpm-rates of wheels and/or axles of the vehicle, and a control unit that regulates the proportion of the driving torque that is transmitted through the torque-transmitting device to the driving axle(s). The method according to the invention has the following steps:

a) detecting the current rpm-rate(s) of one or more driven wheels;

b) evaluating the detected rpm-rate(s) with respect to possible errors that could occur in the detection, transmitting, and processing of the rpm-rate(s);

c) detecting whether a gear shift is about to occur in the transmission; and d) in case at least one of said possible errors is present, preventing that the gear shift could cause the engine to run at rpm-rates detrimental to the safe operation of the vehicle.

The term "safe operation" as used herein encompasses the functionality of the vehicle and its components, so that the components work together in a trouble-free manner, i.e., without abnormal wear, malfunctions or break-downs, and it also includes fuel economy and occupant safety.

The attribute "detrimental to the safe operation of the vehicle" as used herein means that the safe operation of the vehicle is either negatively affected or that the vehicle becomes totally unsafe to operate.

The invention provides in particular that down-shifts into a lower gear will be blocked in cases where the engine would be forced to run at an impermissibly high rpm-rate as a consequence of the down-shift, which would be detrimental to the safe operation in the sense of the term given above. According to the invention, the "down-shift protection" becomes effective, e.g., in a case where after executing an intended gear change, the resulting rpm-rate of the engine would exceed an applicable limit that may, for example, be set at 50 rpm above an electronically restricted engine rpm-limit.

According to a preferred embodiment of the invention, the method step of preventing excessive rpm-rates of the engine, also referred to as down-shift protection or protection from rpm-rates detrimental to the safe operation of the vehicle, involves the use of at least two different characteristic functional relationships, at least one of which depends on a detected value of an operating parameter of the vehicle.

As an example of the foregoing inventive concept, a first characteristic functional relationship is used to prevent the engine from running at an impermissibly high rpm-rate if a gear is engaged and at the same time the clutch is in an engaged condition, i.e., not slipping. A second characteristic functional relationship is used, on the other hand, if not both of the aforementioned conditions are met at the same time.

For example, if the clutch is completely engaged and not slipping, i.e., if the transmission input shaft and the crankshaft run at the same rpm-rate and if a gear is engaged, the output rpm-rate of the transmission be calculated based on rpm-rate of the engine and vice versa, or the rpm-rate of the engine can also be calculated from the rpm-rates of the driven wheels. The rpm-rate of the engine is obtained by taking one-half of the sum of the two wheel rpm-rates (left and right driving wheel) and multiplying it by the respective ratios of the differential and the transmission. Especially in a case where the clutch is only disengaged for a short time period during a gear shift, the short interruption of the power train where the foregoing conditions are no longer present will be of negligible consequence. However, the invention also includes a preferred embodiment where in the temporary absence of one or both of the foregoing conditions, the wheel rpm-rates or the output rpm-rate of the transmission and/or the engine rpm-rate are taken into account by using at least approximate values.

It is further preferred under the method according to the invention, if the characteristic functional relationship to be used is selected on the basis of a detected state or value of an operating parameter. For example in the preceding case, the characteristic functional relationship to be used is selected based on a signal from a sensor for the currently engaged gear level and a signal from a clutch-actuator device.

A preferred embodiment of the inventive method also includes generating a signal or other form of information as to whether or not the rpm-rates of the wheels were determined correctly and to use the information as a criterion for selecting a characteristic functional relationship that the control unit will use to prevent the engine from running at an impermissible rpm-rate.

A correct determination of an rpm-rate in the sense of the present invention means that the values detected by sensors are substantially accurate representations of the actual rpm-rates. A preferred understanding of the term "correct determination of an rpm-rate" is that a registered value represents an rpm-rate detected in the normal operating state of the vehicle, where the normal operating state is characterized by the conditions that the wheels at which the rpm-rates are being detected are neither slipping nor locked and that the respective sensors are functioning properly.

In a particularly preferred embodiment of the inventive method, a calculation is made during or immediately before a gear change to determine the rpm-rate at which the engine would have to run after the completion of the gear shift. This determination is preferably based on the rpm-rate before the gear shift. It is also preferred to use the rpm-rates of the wheels or the output rpm-rate of the transmission before the gear shift for this calculation. Other preferred concepts include using the transmission ratio before and after the gear shift as well as the ratio of the differential to calculate the rpm-rate at which the engine would have to run after the completion of the gear shift.

As a particularly preferred feature of the inventive method, the desired gear change is executed or completed only if the rpm-rate at which the engine is predicted to run after the shift meets one or more predetermined conditions. Under a particularly preferred condition, the rpm-rate at which the engine is predicted to run after the shift is smaller than a given rpm-limit.

Preferably the rpm-limit for the engine is set as a value that is equal and constant for all gear levels of the transmission. As another preferred concept, the rpm-limit is defined as a function of predetermined parameters, e.g., of the position of a fuel-intake controlling element such as a gas pedal, or of the currently active transmission ratio, or of a signal generated by the engine.

A particularly preferred embodiment of the inventive method includes a further determination that is performed if a desired shift into another gear has been denied, i.e. not executed, because the predicted rpm-rate of the engine would be too high or another condition would be violated. In this case, the method requires a calculation whether the next higher gear (in relation to the gear where the shift was denied) would satisfy the condition. Preferably, the condition for shifting into a gear requires in each case that the predicted rpm-rate of the engine be smaller than an rpm-limit that could be of one single value or have different values for the different gears. If a shift into the next higher gear is found to satisfy the applicable condition(s), the shift is executed. Otherwise, this shift, too, is aborted or blocked from being carried out.

Further preferred under the inventive method, if a shift into the next higher gear (as described in the preceding paragraph) has been aborted or blocked, an analogous determination is made again for the next-following higher gear, i.e., two gear levels higher than the originally desired gear.

As a logical extension of the last two paragraphs, the same determination is reiterated proceeding from one to the next higher level, until the corresponding predicted rpm-rate of the engine meets the applicable rpm-limit criterion, at which point the shift into the respective gear is executed.

However, a further preferred concept of the invention provides that the shift is not executed unless additional predetermined conditions are met. For example, the execution of the shift process may be blocked if a predetermined time limit has expired since the gear shift was requested or initiated, or if the rpm-rates of the wheels have increased substantially, e.g., because the vehicle is traveling downhill.

Preferably, the concept of checking several consecutively higher gear levels against a predetermined condition is used if the initially desired gear shift is a down-shift by more than one gear level. However, the concept of checking several consecutively higher gear levels can also be of benefit if the initially desired gear shift is not a multi-level down-shift.

In the case where the checking of consecutively higher gear levels leads back to the currently used level, the checking is preferably terminated without performing a gear shift.

If a further shift into a different gear is initiated before a previously given down-shift command has been fully executed, a preferred embodiment of the inventive method provides that the permissibility of the further shift is to be checked by using the same pre-shift rpm-rate of the engine as was used to check the permissibility of the previously given down-shift command.

Preferably, the pre-shift rpm-rate of the engine is used only if certain predetermined conditions are met. As a particularly preferred condition according to the invention, the elapsed time from the first of the two shift commands or from the interruption of the power train must be within a predetermined limit.

With particular preference, the aforementioned pre-shift rpm-rate is used only if there is assurance that the rpm-rates of the engine and the transmission output shaft still remain essentially correlated.

Preferably, the down-shift protection is not in effect if the transmission is in reverse or neutral at the time when a shift command is entered. The preferred transmission modes for which the down-shift protection is put into effect are the "Drive" mode (D) in an automatic transmission and/or the "Manual" mode (M) in a transmission that includes a manual operating mode.

A particularly preferred embodiment of the invention includes monitoring, whether the clutch is in a slipping state.

Preferably, the clutch slippage is monitored by entering the rpm-rates of the driven wheels or the transmission output shaft and of the engine as well as the ratios of the transmission and the differential into an appropriate calculation.

It is further preferred if after a gear change, at the point where the new gear has already been engaged, the clutch is kept in a slipping state for a predetermined time period, so that the power train is not yet making a kinematically positive connection from the engine to the wheels, although the transmission is already in form-locking engagement. The down-shift protection is preferably performed during this time phase, for example by using the pre-shift rpm-rate of the engine.

Preferably according to the invention, an unwanted slippage of the clutch is made to disappear by increasing the clutch torque (i.e., the torque-transmitting engagement of the clutch) in relation to the engine torque, or by initiating an exploratory phase prior to full engagement of the clutch, or by deactivating a control mode that couples the size of the clutch torque to the size of the engine torque. Under this kind of control, the clutch torque is essentially regulated to equal the engine torque, possibly with a safety factor. Details are given in DE 195 04 847, which is hereby incorporated by reference in the present disclosure.

It should be noted that the terms "blocking a gear shift" or "preventing a gear shift" in this context are used with the particular meaning that the power train is prevented from entering into a complete, positive engagement in a targeted new gear level.

According to a preferred embodiment of the invention, a predetermined characteristic functional relationship is used to determine a theoretical or substitute rpm-rate as a function of the output rpm-rate of the transmission. Preferably, the theoretical rpm-rate is normalized so that it equals the actual value of the engine rpm-rate with the transmission in "Drive" or "Manual" mode. When a down-shift command is given, the theoretical rpm-rate is held at its current value. A shift into a requested or otherwise targeted gear level is blocked, if the value of the theoretical rpm-rate is found to meet certain predetermined criteria.

According to a particularly preferred embodiment of the invention, a shift into a targeted gear level is blocked if $$n_{eng,ps} = n_s \times i_{tg}/i_{cg} > n_{eng,max,tg}.$$

The symbols in this expression have the following meanings:
 $n_{eng,ps}$ predicted post-shift rpm-rate of the engine
 $n_s$ substitute rpm-rate
 $i_{tg}$ transmission ratio of the targeted gear level
 $i_{cg}$ transmission ratio of the current gear level
 $n_{eng,max,tg}$ maximum engine rpm-rate up to which down-shifts into the targeted gear level will be accepted.

A particularly preferred embodiment of the invention allows the down-shift protection to be canceled at least in an indirect way. For example, the down-shift protection can be canceled by setting the substitute rpm-rate $n_s=0$. Preferably, the down-shift protection is canceled in a situation where a predetermined time limit for a gear shift has been exceeded and/or if the neutral or reverse gear has been selected, e.g., by way of a selector lever.

Preferably, the substitute rpm-rate is kept constant for a time period of appropriate length, so that the clutch slippage will have disappeared before the substitute rpm-rate is reset to the then current value of the engine rpm-rate.

As a particularly advantageous aspect of the invention, the down-shift protection remains functional even if there is an error or complete failure in the determination of one or more of the rpm-rates of the vehicle wheels. The down-shift protection can also be relied on if the rpm-rate of the engine has been determined too large because of an error.

A particularly preferred embodiment of the inventive method includes a down-shift protection based on rpm-rates of the vehicle wheels as detected by sensors. As a further feature of this embodiment, the wheel rpm-rates can be subjected to a test to ascertain that they are correct and that they represent a rolling condition of the wheels without slip on the pavement. If the wheel rpm-rates are acceptable according to the test, the down-shift protection routine is performed based on the detected wheel rpm-rates. If the wheel rpm-rates fail the foregoing test, e.g., because the wheels are spinning with slip or are blocked, or because of a sensor failure, the down-shift protection routine is performed independent of the detected wheel rpm-rates.

Accordingly, the inventive methods can include a routine or step in which rpm-rates of vehicle wheels as detected by sensors are subjected to a test of whether or not the rpm-rates have been detected correctly or whether they are usable for determining the values of certain specific parameters.

In the context of the present invention, errors in the rpm-rates of the vehicle wheels include the particular case where no wheel rpm-rate is available, e.g., because of a sensor failure, and they also include cases where false or inaccurate values are being generated.

Preferably, the inventive method can include steps or measures for determining errors in wheel rpm-rates qualitatively and/or quantitatively.

According to a particularly preferred embodiment of the invention, a predetermined error-recognition characteristic is used to determine if an absence of an available wheel rpm-value is due to a short temporary signal failure, or if it is due to a long-term failure, particularly of an rpm sensor.

For example, the inventive method may include an analysis of the time gradients of the wheel rpm-sensor values according to the error-recognition characteristic.

For example, in monitoring the time gradients of the rpm-rates, the analysis can take into account that in an abrupt stop with a blockage of the wheels, the rpm-rates will show a characteristic time gradient (as opposed to a discontinuous step-change to zero) because of the mass moment of inertia of the wheels.

A preferred embodiment of the inventive method also makes use of the fact that a correlation test can be performed between the respective rpm-rates of the engine and the vehicle wheels. The correlation test can also serve to detect when a wheel is blocked or spinning too fast or if there is a failure in a wheel rpm-sensor.

According to a particularly preferred embodiment of the invention, an at least preliminary value is determined for one or more wheel rpm-rates according to a predetermined wheel rpm-characteristic. A preliminary value can be an approximate value or an exact value.

The preferred way of determining the rpm-rates is by setting time intervals and counting pulses generated by the individual teeth of a gear as they pass by a pulse sensor during a given time interval. If no pulse was sensed during a time interval, the inventive method uses the assumption that a pulse is registered immediately after the time interval, and this assumed pulse is assigned also to at least the preceding time interval.

Accordingly, if the time interval T is measured in seconds, the gear has x teeth, and a number p of pulses has been received during the time T, the wheel rpm-rate n is calculated as $n=60*p/(x*T)$.

If no pulses have been counted during the time period T, the wheel rpm-rate according to the assumption stated above is calculated as $n=60/(x*T)$.

The use of an assumed pulse in the absence of at least one counted pulse prevents a discontinuous jump to zero. Particularly, if no pulse is counted over several intervals, consecutive pulse counts will thus follow an asymptotic pattern. This characteristic pattern allows a sensor failure to be recognized.

For example, a sensor failure is indicated if the preliminary rpm-values of consecutive time periods decrease according to a predetermined characteristic functional relationship. A sensor failure is found to exist, e.g., if an rpm-rate decreases by more than 60 rpm from a first to a second interval, by more than 30 rpm from the second to a third interval, and by more than 15 rpm from the third to a fourth interval.

A particularly preferred embodiment of the inventive method includes an analysis based on the time gradients of the rpm-rates, whether a wheel rpm-sensor has generated incorrect values or an abrupt braking maneuver caused the wheels to lock up.

Particularly, the inventive method is able to distinguish between a sensor failure and an abrupt application of the brakes. With abrupt braking, the rpm-rate decays more slowly because of the inertia of the wheels, while the rpm-rate totally disappears in the case of a sensor failure. The different rpm-patterns in the two situations can be taken into account, e.g., in accordance with a predetermined function.

A particularly preferred embodiment of the invention includes a plausibility check of an rpm-rate. In the context of the invention, this term means that a determination is made whether an rpm-value signaled by a wheel rpm-sensor is theoretically possible. The first step in this determination is to detect the respective rpm-rates of at least one wheel and of a shaft in the power train that is coupled to the driving axles. Next, the actual ratio between the two detected rpm-rates is compared to the theoretical ratio that should exist based on the gear ratio in the torque flow path from the aforementioned shaft to the at least one wheel. If a discrepancy is found between the actually detected and the theoretical rpm-ratio, this is interpreted as a violation of the plausibility criterion. Preferred embodiments of the inventive method also include that the discrepancy may be subject to a plausibility limit, so that discrepancies that are less than a prescribed maximum are accepted as plausible.

As a further preferred possibility, the wheel rpm-rate is judged to be implausible if the discrepancy persists longer than a predetermined time limit.

If a wheel rpm-rate has been found to be implausible, the implausible value is preferably not used further for the calculation or determination of other parameters. According to a preferred embodiment of the invention, the power train shaft whose rpm-rate is used to determine the discrepancy is the transmission input shaft. If the clutch is engaged and the transmission is positively coupled to the clutch, the transmission input rpm-rate equals the engine rpm-rate. Based on the rpm-rates of the driven wheels as detected by the wheel rpm-sensors, the transmission input rpm-rate is calculated as the product of the transmission ratio, the differential ratio and one-half of the sum of the rpm-rates of the left and right driven wheel.

According to a particularly preferred embodiment of the invention, after a discrepancy in excess of a given minimum limit has first been detected, the discrepancy between the rpm-rates is monitored during a prescribed, preferably continuous minimum time interval during which the clutch is engaged and the transmission is in gear.

It is particularly preferred if after an observation interval less than or equal to the aforementioned minimum time interval, the observed rpm-ratio or rpm-rate is judged to be plausible, if the discrepancy within the observation interval is less than a given maximum limit.

Preferably, the given maximum limit is set equal to the given minimum limit.

Under a particularly preferred concept of the inventive method, after a failure of a wheel rpm-sensor has been detected, at least certain specific gear shifts in the transmission are blocked from being executed. This can also include a provision whereby the gear shifts are blocked if it has been found that the wheel rpm-rate was determined incorrectly. The primary purpose of blocking the transmission from shifting gears is to prevent that incorrect wheel rpm-values will lead to impermissibly high engine rpm-rates after a gear shift.

According to a particularly preferred embodiment of the invention, the wheel rpm-rate can be replaced at least temporarily by a substitute rpm-rate based on a prescribed characteristic functional relationship.

Also preferred is a subroutine or step in the inventive method where a failure-indication flag is set if certain wheel rpm-rates have been determined either incorrectly or not at all. With particular preference, the failure indication differentiates between the states "rpm-value available, but incorrect" and "rpm-value not available". As a further preferred possibility, a failure-indication flag or binary bit is set only if all of the wheel rpm-rates have been determined incorrectly. In the case where only a part of the wheel rpm-rates have been determined incorrectly, the preferred procedure is to use a theoretical or substitute rpm-rate for the subsequent calculations. With particular preference, the substitute rpm-rate is determined based on the correctly determined rpm-value.

According to a particularly preferred embodiment of the invention, the blocking of gear shifts in the transmission is canceled after the unavailable or incorrect wheel rpm-value has been replaced by a plausible substitute rpm-rate.

Under a further preferred embodiment of the inventive method, the blocking of gear shifts is canceled if prescribed criteria are met, for example is there is assurance that certain shafts in the power train (including in particular the crankshaft of the engine) will not be forced to turn at impermissibly high rpm-rates. One possibility is to make a determination based on other parameter values that an impermissibly high rpm-rate cannot occur even with a shift into first gear. A preferred set of criteria for canceling the blocking of gear shifts includes:

1. The engine rpm-rate is less than a predetermined limit, which is preferably set at 1200 rpm.
2. The clutch is substantially in full engagement.
3. The transmission is set at a gear level other than neutral.

It should be noted that the first of the three criteria could also be based on an rpm-rate other than the predetermined limit for the engine rpm-rate.

According to a particularly preferred embodiment of the invention, a down-shift into a targeted gear is under certain conditions performed in steps, starting at a high gear (preferably the highest gear level of the transmission) and shifting the transmission in each step to the next lower gear level, ending with the targeted gear. With particular preference, the transmission is held at each gear level for at least a preset time period to ensure that the engine rpm-rate and the transmission input rpm-rate have been synchronized. This stepwise down-shift is the preferred mode if the clutch has been disengaged longer than a predetermined time period, or after the transmission has been running in neutral.

Under a further preferred embodiment of the inventive method, if the transmission is in the neutral mode or after the clutch has been disengaged for a prolonged time period, the transmission is shifted into a desired gear, e.g., by shifting first into the second-highest gear and then down-shifting in steps to the targeted gear.

According to a particularly preferred embodiment of the invention, the gears are engaged in a prescribed sequential order depending on the presence of predetermined conditions.

According to a particularly preferred embodiment of the invention, detect ed wheel rpm-values are analyzed to verify that they are in the correct correlation to the vehicle speed. This may, e.g., include a determination whether a driven wheel is partially slipping, i.e., not in a state of pure rolling motion in relation to the pavement. The determination may be performed according to different categories according to the operating state of the motor vehicle. For example, based on a known throttle valve position or engine torque, a known current gear level, and a known substantially full engagement of the clutch, the vehicle speed can be at least coarsely estimated. Based on the estimate, it is possible to judge the plausibility of the detected wheel rpm-rates.

As a further concept, a particularly preferred embodiment of the inventive method uses the maximum rpm-difference that is permissible in a normal operating state of the vehicle. The maximum rpm-difference in the context of the inventive method is defined as the maximally permissible difference between the rpm-rates of two specifically designated wheels. For example, in a front-wheel drive car, the rpm-difference criterion would preferably be applied to a difference of the rpm-rates between the left and right front wheel.

A "normal operating state" in the sense of the present invention exists if the wheels are neither locked nor spinning without traction, and if a correct determination of the wheel rpm-rates is assured.

According to a particularly preferred embodiment of the invention, a deviation from the normal operating state is indicated if an rpm-difference is found to be larger than the prescribed maximum permissible difference. Preferably, the maximum permissible difference is set so that it equals the largest rpm-difference that is theoretically possible in the normal operating state. Thus, the maximum permissible rpm-difference depends in particular on the minimum turning radius of the vehicle. With particular preference, the maximum permissible rpm-difference is set according to the formula $$\Delta n_{max} = \frac{900 \times F_c \times w}{\pi^2 \times m \times r_w^2 \times i_d \times i_t \times n_e}$$

wherein the symbols have the following meanings:

$\Delta n_{max}$ maximum rpm-difference
$F_c$ maximum centrifugal force on the vehicle
w track width of the vehicle
m vehicle mass
$r_w$ wheel radius
$i_d$ ratio of the differential
$i_t$ ratio of the transmission
$n_e$ rpm-rate of the engine Preferred embodiments of the inventive method further include any combination of the individual steps and concepts discussed above.

Further in response to the stated objectives, the invention proposes a motor vehicle that is equipped with a drive source producing a driving torque, a clutch or other torque-transmitting device, a transmission, an arrangement of one or more rpm sensors to detect rpm-rates of wheels and/or axles of the vehicle, and a control unit that regulates the proportion of the driving torque that is transmitted through the torque-transmitting device to the driving axle(s). The motor vehicle according to the invention is further equipped with:

a) one or more sensors for detecting the current rpm-rate (s) of one or more driven wheels;
b) a processing unit for evaluating the detected rpm-rate (s) with respect to possible errors that could occur in the detection, transmitting, and processing of the rpm-rate (s);
c) a means for detecting whether a gear shift is about to occur in the transmission; and
d) a means for preventing that the gear shift could cause the engine to run at rpm-rates detrimental to the safe operation of the vehicle in case at least one of said possible errors is present.

Thus, a vehicle according to the invention has at least one rpm-rate restricting safety feature to protect the engine from being forced to run at excessive rpm-rates which can be caused by down-shifting and are detrimental to the safe operation of the vehicle.

In a particularly preferred embodiment, a vehicle according to the invention has a device to enter a shift command, such as a shift lever, working in an arrangement where the shift command is executed only if certain prescribed conditions are met. One such condition is for example that following the gear shift, the predicted engine rpm-rate (based on a calculation) would not exceed a permissible limit.

A preferred embodiment of a vehicle according to the invention is equipped with a device for detecting errors in the determination of rpm-rates of the vehicle wheels.

With particular preference, a vehicle according to the invention has a device that detects a failure in a wheel rpm-sensor.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The following detailed description of the invention is based on the attached drawing, in which.

DETAILED DESCRIPTION OF PREFERRED EMBODIMENTS

Figure 1:
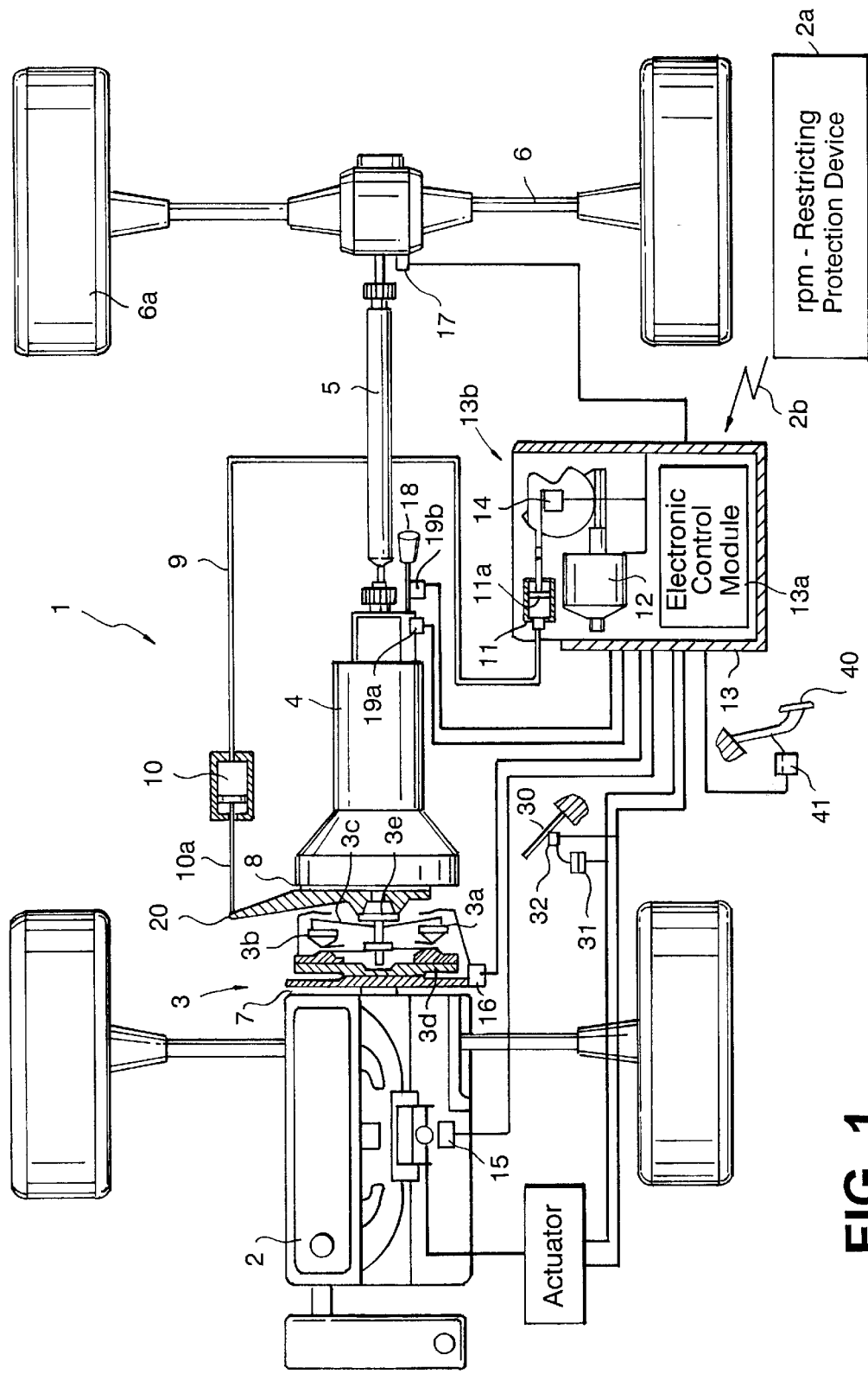
FIG. 1 represents a first embodiment of a motor vehicle according to the invention.

FIG. 1 represents schematic view of a motor vehicle 1 with a drive source 2, such as an internal combustion engine. The vehicle has an rpm-restricting protection device as indicated schematically by the box 2a. The protection device 2a cooperates with components of the vehicle, as indicated by the arrow 2b. Alternatively, or in addition, the device 2a can also function as a failure detector for the wheel rpm-sensor(s). The power train of the motor vehicle further contains a torque-transmitting system 3 (typically a clutch) and a transmission 4. In the illustrated example, the torque-transmitting system 3 is interposed in the torque flow between the engine and the transmission. The drive torque produced by the engine 2 flows through the torque-transmitting system 3, the transmission 4, the drive shaft 5, and the driving axle 6 to the wheels 6a.

The torque-transmitting system 3 is configured as a clutch, typically a friction clutch, laminar-disc clutch, magnet powder clutch, or a converter-bypass clutch, including self-adjusting and wear-compensating types of clutches. The transmission 4 is represented as a manual-shift transmission. However, the scope of the invention also extends to automated shift transmissions of a type where wheel traction is interrupted during gear shifts and in which gears are changed automatically by means of at least one actuator.

The invention is also applicable to vehicles with an automatic transmission that typically consists of planetary gear stages and performs gear shifts while maintaining essentially uninterrupted traction.

The invention can further be used in vehicles with a continuously variable transmission such as a chain-belt transmission with adjustable cone pulleys. A torque-transmitting system 3 such as a clutch or friction clutch can also be arranged on the output side of an automatic transmission. The torque-transmitting system can further be designed to work as a start-up clutch and/or a reverse-gear clutch and/or a safety clutch with a regulated torque-transmitting engagement that is governed by a control device. The torque-transmitting system can be a dry-friction clutch or a wet-friction clutch that runs in a fluid, or it can also be a torque converter.

The torque-transmitting system 3 has an input side 7 and an output side 8. To transmit a torque between the input side and the output side, a force is applied to the clutch disc 3a by means of the pressure plate 3b, the diaphragm spring 3c, the release bearing 3e, and the flywheel 3d. The application of the force is controlled by an actuator through the release lever 20.

The torque-transmitting system 3 runs under the control of a control unit 13, which may include the electronic control module 13a and the actuator 13b. The electronic control module 13a and the actuator 13b may also be accommodated in physically separate units or enclosures.

The control unit 13 can include the control circuit as well as the power circuit for the electric motor 12 of the actuator 13b. This has the advantage that the actuator and electronic circuit can be accommodated within a single portion of space. The actuator consists of a drive motor 12, such as an electric motor, acting on a master cylinder 11 through a gear arrangement such as a worm-gear, spur-gear, crank mechanism, or a threaded spindle. The connection to the master cylinder can be direct or through a rod mechanism.

The movement of the actuator output, i.e., of the master cylinder piston h1a is detected by a clutch displacement sensor 14 which senses the position, speed, or acceleration of a quantity that is proportionally dependent on the amount, speed, or acceleration of clutch engagement. The master cylinder 11 is connected to the slave cylinder 10 through a pressure medium conduit 9. The output element 10a of the slave cylinder is connected to the release lever 20 (or an equivalent release element), so that the movement of the output part 10a of the slave cylinder 10 causes the release element 20 to be moved or swivelled, whereby the amount of torque flowing through the clutch is being regulated.

The actuator 13b for regulating the torque flowing through the clutch 3 can be a pressure-based actuator, i.e., equipped with a master cylinder and a slave cylinder. The pressure medium can be a hydraulic fluid or a pneumatic medium. The master cylinder may be powered by an electric motor 12 with an electronic control. The driving element of the actuator 13b could also be a device other than an electric motor, e.g., a pressure-operated device. As a further possibility, one could use magnet actuators to set the position of an element.

The amount of torque flowing through a friction clutch is regulated by the amount of pressure exerted on the friction linings of the clutch disc between the flywheel 3d and the pressure plate 3b. The force on the pressure plate 3b is controlled through the position of the release element 20, which may be a release fork or a concentric slave cylinder. The pressure plate is movable so that it can be set and held at any position within a limited range. One end position in the range represents a completely engaged condition of the clutch, while the other end position represents a completely disengaged condition. To regulate the clutch so that it will transmit less than the full amount of torque applied to the input side of the clutch by the engine, the clutch plate 3b is set to an intermediate position between the two limits. The clutch can be held fixed at the set position through an appropriate control of the release device 20. The clutch can also be set for a clutch torque that exceeds the current engine torque by a controlled amount. This allows the full amount of the currently available engine torque to be transmitted, while temporary torque fluctuations or shocks in the power train are absorbed and/or isolated in the clutch.

The arrangement for controlling and regulating the torque-transmitting system further includes sensors by which the relevant operating variables of the entire system are monitored continuously or at certain times. The sensor signals are processed by the control unit which may also be equipped to exchange signals with other electronic units, e.g., of the engine, an anti-lock braking system, or an anti-slip regulating system. The sensors serve to detect, e.g., rpm-rates of the wheels and the engine, the gas-pedal position, the throttle-valve position, the currently used gear level of the transmission, a signal that indicates the driver's intent to shift gears, and other data that characterize the momentary operating state of the vehicle.

FIG. 1 shows a throttle valve sensor 15, an engine rpm-sensor 16, and a vehicle-speed sensor 17, which are used to collect information in the form of sensing and measuring signals and send the information to the control unit 13. The electronic module 13a, typically a computer unit that is part of the control unit 13, serves to process the information received from the sensors and to send control commands to the actuator 13b.

The transmission is a gear-shifting transmission in which the gear ratio is changed in discrete steps by means of a shift lever. Furthermore, at least one sensor 19b is arranged at the shift lever 18 for the purpose of detecting a condition that would indicate the driver's intention to shift gears and/or detecting the current gear level set in the transmission. A sensor 19a is coupled directly to the transmission to also perform at least one of the functions of detecting the driver's intent to shift gears and/or the current gear level set in the transmission. To perform the function of detecting an intent to shift gears, at least one of the sensors 19a, 19b can be a force sensor responsive to a force acting on the shift lever. A displacement sensor or position sensor can likewise be used for this purpose, if the control unit is designed to interpret a change in the position sensor signal as an indication that the driver intends to shift gears.

The control unit is connected for signal communication with all sensors and is designed to evaluate the sensor signals and other input variables and to control or regulate the at least one actuator through command signals dependent on the results of the evaluation. The drive element 12 of the actuator, e.g., an electric motor, receives from the control unit a control input dependent on the measurement values, system inputs, or other signals that the control unit receives from the sensors. The control unit contains a control program that can be implemented in hardware or software, to evaluate the incoming signals and to calculate or determine the output quantities based on comparisons, functions, and/or system characteristics.

It is advantageous if the hardware and/or software implemented in the control unit 13 includes functional modules, or if the control unit 13 is connected to functional modules, to determine torque, gear-shift position, slippage, and/or other conditions that are indicative of the operating state of the vehicle. The functional modules can be implemented as control programs in hardware and/or software in which the torque of the drive source 2, the gear position of the transmission 4, the slip in the torque-transmitting system 3, and the current operating state of the vehicle 1 are determined from the incoming sensor signals. The gear-position module determines the currently set gear level based on signals received from the sensors 19a and 19b. The sensors 19a, 19b are coupled to the shift lever and/or to actuator elements inside the transmission such as, e.g., a central shift-actuator shaft or shift-actuator rod, to detect the position, speed or other operating variable of the shift lever or actuator element. There can further be a sensor 31 coupled to the engine-load control lever 30, typically the gas pedal of the vehicle, to detect the position of the lever 30. In addition, there can be an on/off sensor 32 arranged at the gas pedal, sending an "on" signal when the gas pedal is depressed and an "off" signal when it is not depressed. The sensor 31, in contrast, serves to detect the degree of depression of the gas pedal.

Also shown in FIG. 1 is a brake actuator element 40 to operate the main brake or the parking brake, such as a brake pedal, a parking brake lever or a hand- or foot-operated actuating element of the parking brake. At least one sensor 41 is arranged at the actuating element 40 to monitor its state of actuation. The sensor 41 can, e.g., be a digital on/off sensor, such as a switch, to detect whether or not the brake-actuating element 40 has been applied. The sensor can be connected to a signal device such as a brake light that signals that the brake is being actuated. This kind of arrangement can be used for the main brake as well as the parking brake. The sensor can also be configured as an analog sensor, such as a potentiometer, to detect the degree of actuation of the brake-actuating element. This sensor, too, can be connected to a signal device.

Figure 2:
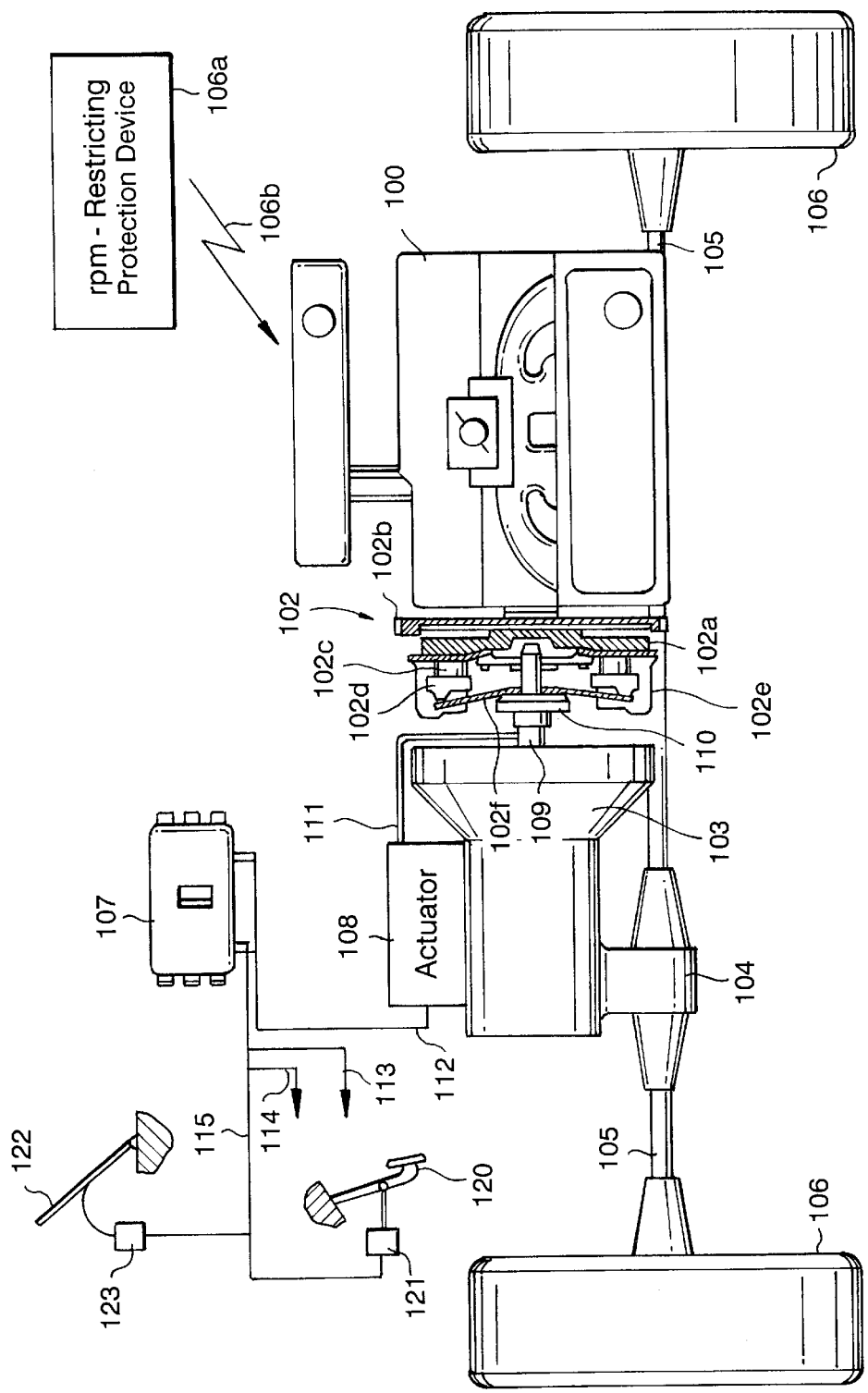
FIG. 2 represents a second embodiment of a motor vehicle according to the invention.

FIG. 2 represents schematic view of a power train of a motor vehicle with a drive source 100, a torque-transmitting system 102, a transmission 103, a differential 104, as well as driving axles 105 and wheels 106. The vehicle has an rpm-restricting protection device 106a cooperating with components of the vehicle as indicated by the arrow 106b. Alternatively, or in addition, the device 106a can also function as a failure detector for the wheel rpm-sensor(s). The torque-transmitting system 102 is attached to a flywheel 102a. The latter typically carries an external tooth profile 102b that is engaged by the starter pinion in the starting process of the combustion engine. The torque-transmitting device includes a pressure plate 102d, a clutch cover 102e, a diaphragm spring 102f, and a clutch disc 102c with friction linings. The clutch disc 102c and in some cases a damper are arranged between the pressure plate 102d and the flywheel 102a. An energy-storing device such as a diaphragm spring 102f applies an axial force to the pressure plate, pushing the latter towards the clutch disc. An actuating element 109 such as, e.g., a concentric slave cylinder serves to actuate the torque-transmitting system. A release bearing 110 is arranged between the concentric slave cylinder an the tongues of the diaphragm spring 102f. When the release bearing moves along the axial direction, it pushed against the tongues of the diaphragm and thereby disengages the clutch. The clutch can be configured as either a push- or pull-actuated clutch.

The actuator 108 performs the actuating functions of an automated shift transmission, and it also includes the actuator unit for the torque-transmitting system. The actuator 108 drives internal shifter elements of the transmission such as, e.g., a shift-actuating cylinder or shift-actuating rods or a central shift-actuating shaft of the transmission. The gears can be shifted, e.g., in the sequential order of the gear levels, or also in an arbitrary order. The connection 111 serves to operate the clutch-actuating element 109. The control unit 107 is connected to the actuator 108 through the signal connection 112. The three connector lines 113 to 115 are representative of three types of signal communication to and from the control unit 107: line 113 carries control commands from the control unit; line 114 carries incoming signals; and line 115 connects to other electronic units, e.g., by means of a data bus.

To set the vehicle into motion from standstill or from a slow crawl, i.e., to positively initiate an acceleration, the driver essentially does nothing but depress the gas pedal 122, as the controlled or regulated automatic clutch-actuating system controls the amount of torque flowing through the torque-transmitting system during a start-up phase. The driver's desire for more or less pick-up acceleration is communicated through the load control lever or gas pedal 122, detected by the sensor 123, and transmitted to the control unit. Thus, the gas pedal position which is detected by the sensor 123 is used as a control input for the start-up process of the vehicle.

During a start-up process, the amount of torque passing through the clutch into the drive train is determined, e.g. in the form of a target value $M_{c,target}$ that is calculated by means of a prescribed function or characteristic relationship, e.g., as a function of the engine rpm-rate.

As the gas pedal is depressed by a certain amount (a) during a start-up from standstill or from a slow crawl, an engine control unit directs the engine to generate a certain amount of engine torque. The control unit 107 regulates or controls the amount of torque flowing through the clutch according to prescribed functions or characteristic relationships, so that a stable equilibrium condition is set up between the engine torque and the clutch torque. In this state of equilibrium, a given gas pedal position (a) produces defined levels of start-up rpm-rate, engine torque, clutch torque, and wheel torque at the driven wheels of the vehicle. The functional relationship between engine torque and rpm-rate during the start-up phase will herein be referred to as start-up characteristic. The aperture position of the throttle valve is proportional to the gas pedal position (a).

Also shown in FIG. 2 is a brake actuator element 120 to operate the main brake or the parking brake, such as a brake pedal, a parking brake lever or a hand- or foot-operated actuating element of the parking brake. At least one sensor 121 is arranged at the actuating element 120 to monitor its state of actuation. The sensor 121 can, e.g., be a digital on/off sensor, such as a switch, to detect whether or not the brake-actuating element 120 has been applied. The sensor can be connected to a signal device such as a brake light that signals that the brake is being actuated. This kind of arrangement can be used for the main brake as well as the parking brake. The sensor can also be configured as an analog sensor, such as a potentiometer, to detect the degree of actuation of the brake-actuating element. This sensor, too, can be connected to a signal device.

Figure 3A:
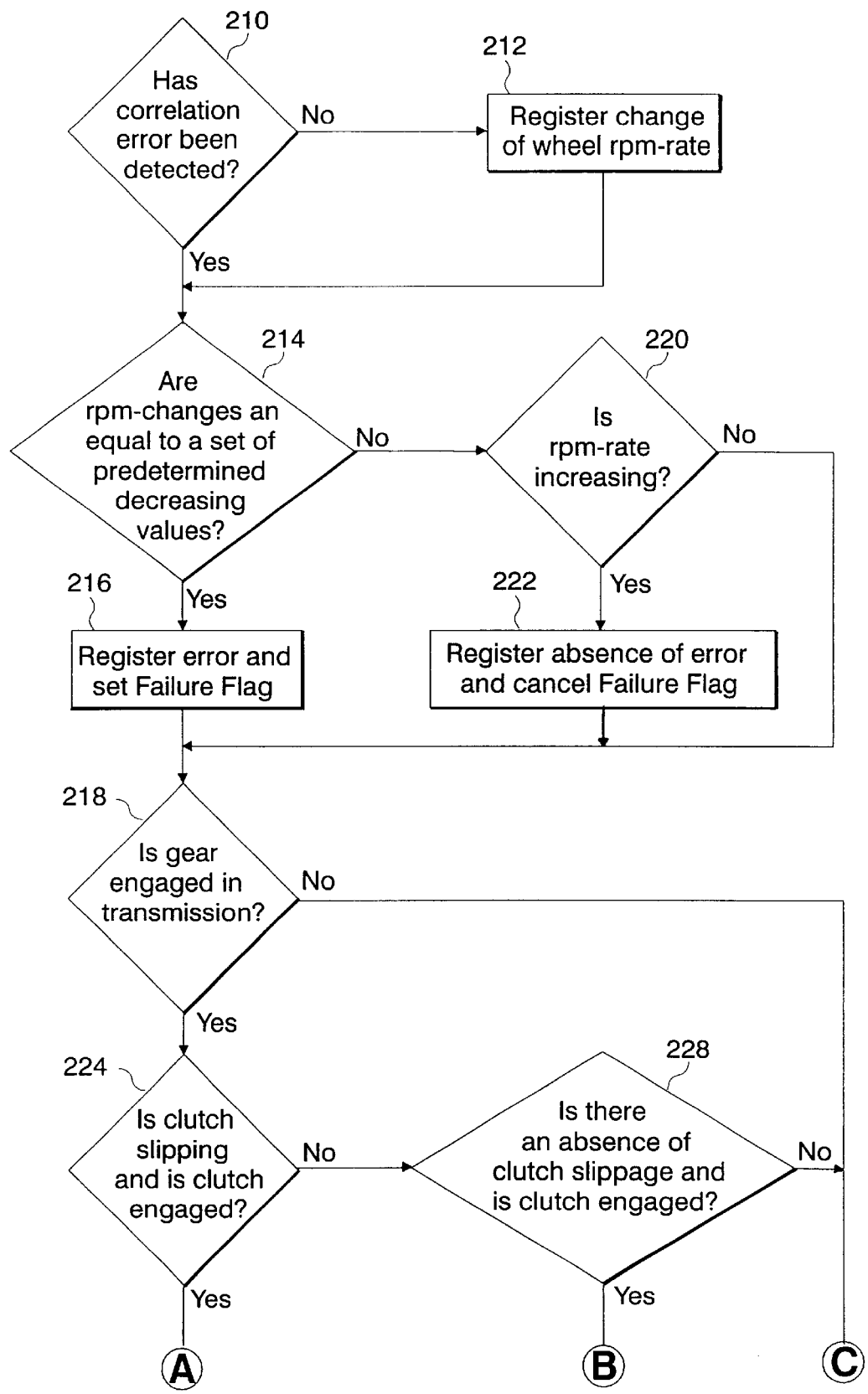
FIG. 3 represents a flow-chart diagram of an embodiment of the inventive method.
Figure 3B:
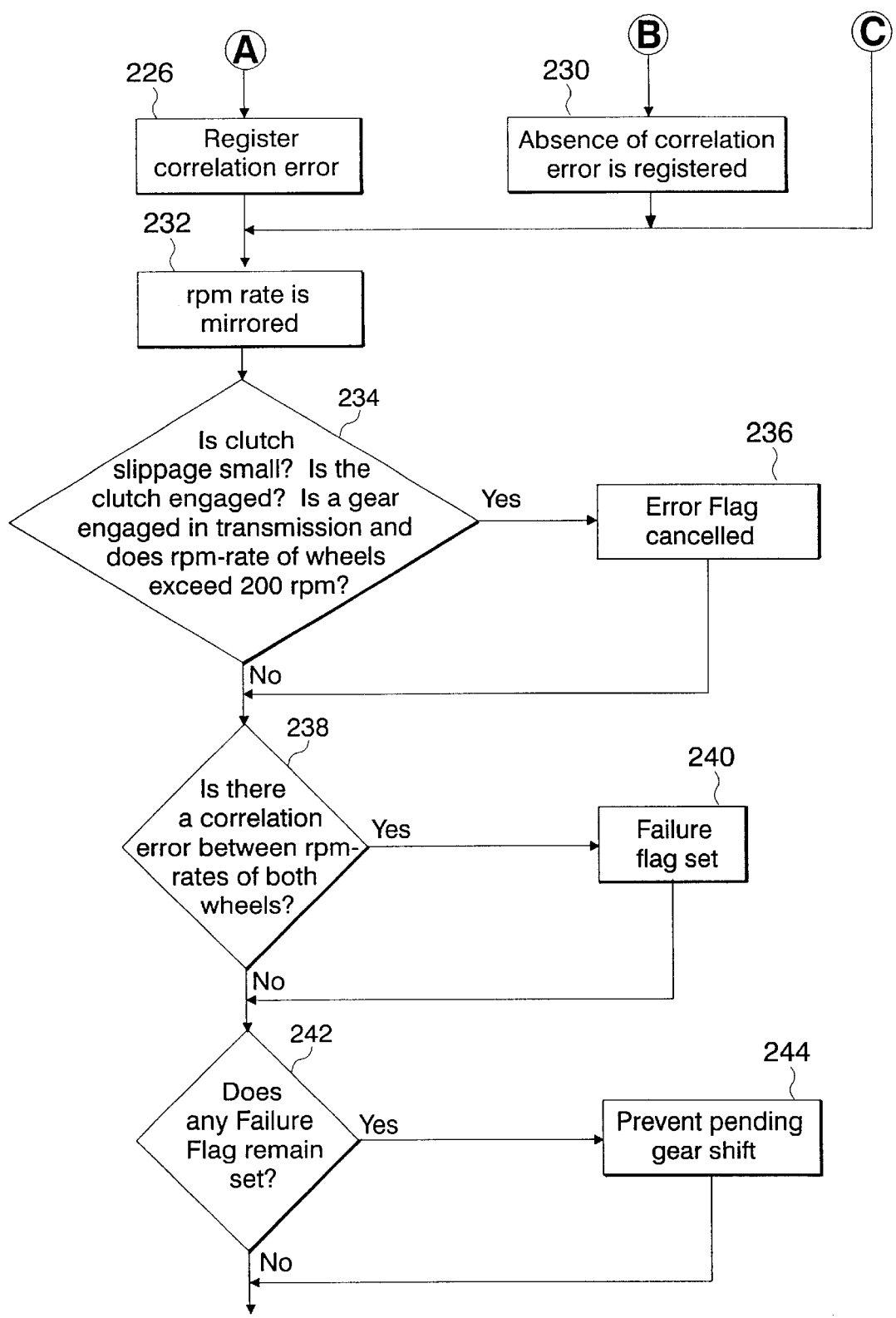

To summarize, FIGS. 1 and 2 represent two presently preferred power trains equipped with an rpm-restricting protection device 2a, 106a in accordance with the present invention. A preferred embodiment of the improved method will now be described in detail with reference to the flow chart of FIG. 3, representing the method in terms of individual steps, as follows:

In step 210, a test is performed, whether or not a correlation error, i.e., an incompatible or non-correlatable value has been detected in an rpm-rate of one of the wheels of the vehicle.

If no correlation error is present, the method proceeds to step 212, where the change of the wheel rpm-rate is registered as the difference between the current rpm-value and the previously detected rpm-value, i.e., $\Delta n = n_{new} - n_{old}$.

Next, in step 214, a test is performed, whether the rpm-changes $\Delta n$ of three consecutive cycles are equal to a set of predetermined decreasing values $\Delta n_1$, $\Delta n_2$, $\Delta n_3$, e.g., 60 rpm, 30 rpm, and 15 rpm, respectively. These numerical values, as well as the choice of using a set of three, represent only illustrative examples. If the values $\Delta n_1$, $\Delta n_2$, $\Delta n_3$ have been detected in the prescribed sequence and numerical amounts, the method proceeds to step 216, where the presence of an error in the time gradient of the rpm-rates is registered and a failure flag is set. The method then proceeds to step 218, where a test is performed whether or not a gear is engaged in the transmission.

However, if the pattern of consecutive decreases $\Delta n_1$, $\Delta n_2$, $\Delta n_3$ according to the criterion of step 214 is not found to be present, the method proceeds to step 220 representing a test whether the rpm-rate is increasing while at the same time there is no correlation error present. In the negative case, the method proceeds to step 218 (described above).

In the affirmative case of step 220, the method proceeds to step 222 where the absence of an error in the time gradient of the rpm-rate is registered and the failure flag is cancelled. The method proceeds to step 218 (described above).

In the affirmative case of step 218, i.e., if a gear is engaged in the transmission, the method proceeds to step 224 representing a test for the simultaneous presence of a signal indicating slippage in the clutch and a signal indicating an essentially engaged condition of the clutch during a set observation interval.

In the affirmative case of step 224, the method proceeds to step 226, where the presence of a correlation error is registered.

In the negative case of step 224, the method proceeds to step 228 representing a test for the simultaneous presence of signals indicating the absence of slippage and an essentially engaged condition of the clutch during a set observation interval.

In the affirmative case of step 228, the method proceeds to step 230, where the absence of a correlation error is registered, and the method proceeds to step 232.

In the negative case of step 228, the method proceeds directly to step 232, where the rpm-rate is mirrored, if the outcome of step 228 was negative. The term "mirrored" in the present context means that the rpm-rate of the wheel with the correlation error is replaced by the rpm-rate of the wheel on the opposite side of the same axle.

The method proceed to step 234, representing a test whether the slippage in the clutch is essentially small, the clutch is engaged, a gear is engaged in the transmission, and the rpm-rate of the vehicle wheels exceeds 200 rpm.

In the affirmative case of step 234, the method proceeds to step 236, where the error flag for the time gradient of the rpm-rate is cancelled. The method proceeds to step 238, where a test is made for a correlation error between the rpm-rates of both driven wheels. In the affirmative case of step 238, the method proceeds to step 240, where a failure flag is set.

The next step, 242, represents a test whether any failure flag remains set. In the affirmative case, the method proceeds to step 244 where a pending gear shift is prevented from being executed or from being completed. Thus, the method ensures that the engine is not caused to run at impermissibly high rpm-rates.

Figure 4:
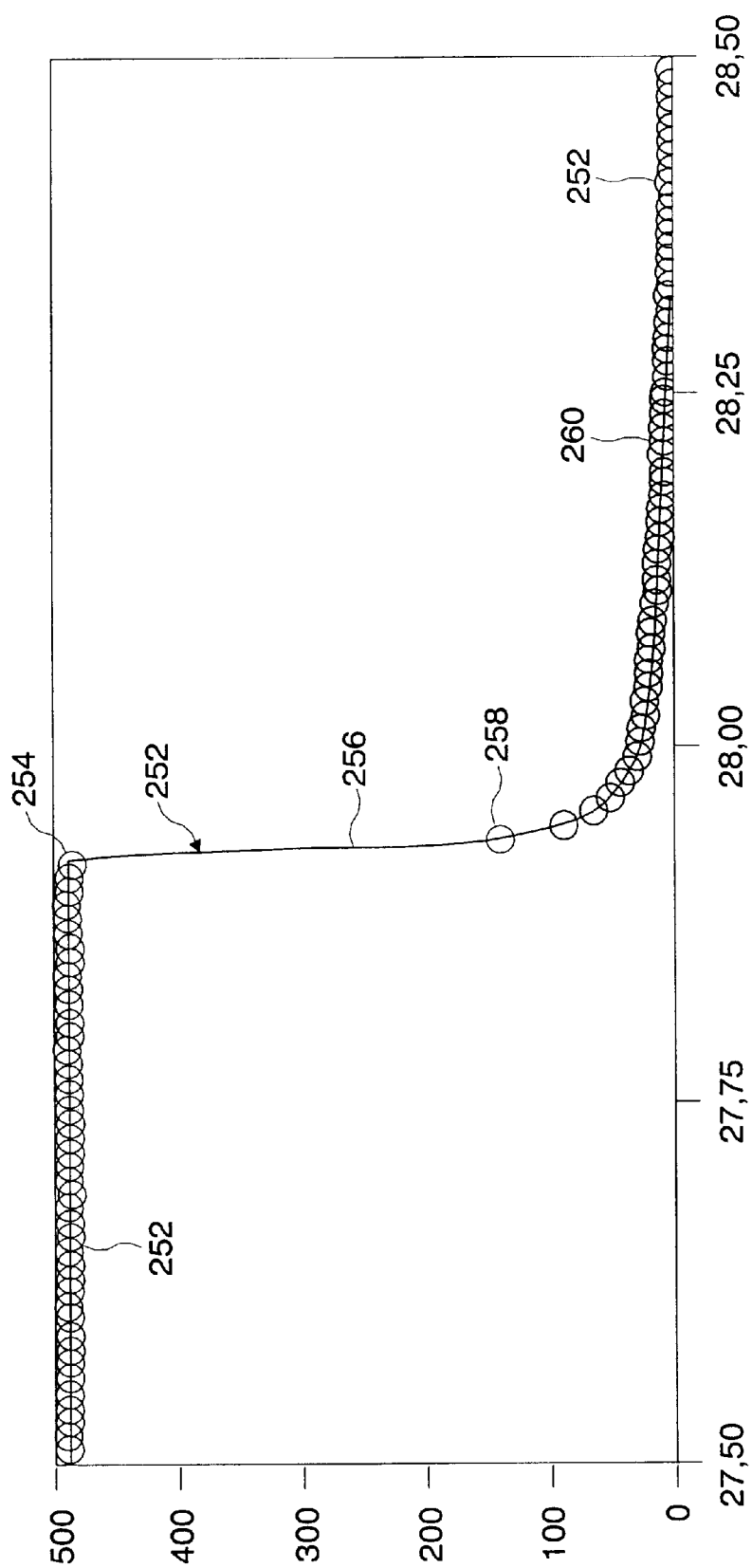
FIG. 4 represents an example of a time profile of calculated rpm-values obtained by carrying out one of the procedures under the method according to the invention.

The graph in FIG. 4 represents an example of a time profile with a sudden breakdown and subsequent asymptotic decay of the rpm-rate which, according to the inventive method, would be indicative of a sensor failure.

Each of the data points (represented by small circles) in the graph represents an rpm-value, typically determined by counting pulses generated by the individual teeth of a gear as they pass by a pulse sensor during a given time interval. If no pulse was sensed during a time interval, the inventive method uses an assumed pulse count of 1 rather than 0.

Accordingly, if the time interval T is measured in seconds, the gear has x teeth, and a number p of pulses has been received during the time T, the wheel rpm-rate n is calculated as n=60*p/(x*T). If no pulses have been counted during the time period T, the wheel rpm-rate according to the assumption stated above is calculated as **n=60/(x*T)**.

The first segment of the curve 252 plotted in FIG. 4 represents a sequence of substantially constant values of about 500 rpm. At the point 254, there is a discontinuity in the form of a pronounced drop in the rpm-rate as represented by the portion 256 of the curve 252. Between the points 258 and 260 of the graph, the curve progressively flattens out and continues asymptotically towards zero. This decay profile also applies if an absence of pulses is detected over a prolonged time period.

According to the inventive method, this characteristic decay profile of the rpm-rate is used to identify the presence of a wheel rpm-sensor.

As a general note, wherever the word "or" is used in the present context in reference to features of the invention, it may be used either in the Boolean sense (one or the other or both) or as an exclusive "or" (one or the other but not both).

As a further general note, where the terms "control" and "regulation" are used within the context of the present invention, they should be understood in a broad sense, i.e., encompassing closed-loop types of regulation and/or control as well as open-loop controls in the sense of the relevant DIN Standards.

Without further analysis, the foregoing will so full reveal the gist of the present invention that others can, by applying current knowledge, readily adapt it for various applications without omitting features that, from the standpoint of prior art, fairly constitute essential characteristics of the generic and specific aspects of the above outlined contribution to the art of motor vehicles and controlling the rpm-rates of its prime mover and, therefore, such adaptations should and are intended to be comprehended within the meaning and range of equivalence of the appended claims.

What it claimed is:

1. A method of operating a motor vehicle with an engine producing a driving torque, a clutch, a transmission shiftable between different gear levels, at least one driven wheel, and a control unit to control how much of the driving torque is transmitted through the clutch to the at least one driven wheel; the method comprising the steps of:
   a) determining a current rpm-rate of the at least one driven wheel;
   b) examining the current rpm-rate for potential errors;
   c) detecting whether a command for a gear shift has been initiated;
   d) in case an error was found in step b), taking protective measures so that the engine cannot be forced to run at rpm-rates detrimental to the safe operation of the vehicle as a consequence of executing and completing said gear shift, wherein step a) additionally comprises detecting operational parameter values of the motor vehicle, and step d) additionally comprises using at least two different characteristic functional relationships to carry out said prevention, at least one of the characteristic functional relationships being dependent on at least one of said operational parameters.

2. The method of claim 1, wherein step d) additionally comprises selecting one of said at least two characteristic functional relationships to carry out said prevention at a given moment in time, said selection being dependent on a momentary value of at least one of said operational parameters.

3. The method of claim 1, wherein step d) additionally comprises using at least one characteristic functional relationship to carry out said prevention if at least one prescribed condition is met.

4. The method of claim 3, wherein the at least one condition comprises that a gear is engaged in the transmission.

5. The method of claim 3, wherein the at least one condition comprises that the clutch is not slipping.

6. The method of claim 3, wherein the at least one condition comprises that no error in the rpm-rate was found in step b) of the method.

7. The method of claim 1, wherein at predetermined points in time an attempt is made to perform step a).

8. The method of claim 7, wherein after the attempt, a test is made that the rpm-rate of the at least one driven wheel was determined correctly.

9. A method of operating a motor vehicle with an engine producing a driving torque, a clutch, a transmission shiftable between different gear levels, at least one driven wheel, and a control unit to control how much of the driving torque is transmitted through the clutch to the at least one driven wheel; the method comprising the steps of:
   a) determining a current rpm-rate of the at least one driven wheel;
   b) examining the current rpm-rate for potential errors;
   c) detecting whether a command for a gear shift has been initiated;
   d) in case an error was found in step b), taking protective measures so that the engine cannot be forced to run at rpm-rates detrimental to the safe operation of the vehicle as a consequence of executing and completing said gear shift, wherein step d) additionally comprises calculating a predicted engine rpm-rate at which the engine would be forced to run if the gear-shift command found to have been initiated in step c) were executed.

10. The method of claim 9, wherein said predicted rpm-rate is determined dependent on an rpm-rate of the engine at the time when said gear-shift command was initiated.

11. The method of claim 10, wherein the predicted rpm-rate is determined by:
   determining an actual engine rpm-rate at a time when the transmission is in gear at a current transmission ratio and the clutch is fully engaged with no slippage;
   calculating one of a transmission input rpm-rate and a wheel rpm-rate of the at least one driven wheel based on said engine rpm-rate and said current transmission ratio;
   calculating a theoretical engine rpm-rate at which the engine would have to run if said gear-shift command were executed with the at least one driven wheel running at said theoretical rpm-rate.

12. The method of claim 11, wherein said actual engine rpm-rate is used again in a subsequent cycle of the method if a new gear-shift command is detected before a current gear shift has been completed.

13. The method of claim 11, wherein said actual rpm-rate of the engine is used again in a subsequent cycle of the method if less than a prescribed time limit has expired since said time when the transmission was in gear and the clutch was fully engaged with no slippage, so that the actual rpm-rate of the engine can still be substantially correlated to an output rpm-rate of the transmission.

14. The method of claim 11, wherein the method is canceled if a current gear level from which a gear shift is to be carried out comprises one of the neutral gear level and the reverse gear level.

15. The method of claim 11, wherein said actual rpm-rate of the engine is used again in a subsequent cycle of the method if less than a prescribed time limit has expired since the new gear was engaged in the transmission, and wherein during said prescribed time limit the clutch is substantially in a slipping state.

16. The method of claim 9, wherein said predicted rpm-rate is determined dependent on an rpm-rate of the at least one wheel at the time when said gear-shift command was initiated.

17. The method of claim 9, wherein said predicted rpm-rate is determined dependent on a gear ratio at which the transmission was operating at the time when said gear-shift command was initiated.

18. The method of claim 9, wherein said gear-shift command is executed only if said predicted rpm-rate meets a prescribed set of conditions.

19. The method of claim 18, wherein the prescribed set of conditions includes the special condition that said predicted rpm-rate is below a prescribed limit.

20. The method of claim 19, wherein the prescribed limit is substantially one constant rpm-value applicable to all of the different gear levels.

21. The method of claim 19, wherein the prescribed limit is dependent on which of the different gear levels is engaged in the transmission.

22. The method of claim 19 wherein, if said gear-shift command is not executed although said special condition is met, a determination is made whether the prescribed set of conditions would be met if the transmission were shifted into the next higher gear level in relation to the level for which said gear-shift command was initiated.

23. The method of claim 19 wherein, if said gear-shift command is not executed and said special condition is not met, a determination is made whether the prescribed set of conditions would be met if the transmission were shifted into the next higher gear level in relation to the level for which said gear-shift command was initiated.

24. The method of claim 23 wherein, if said determination indicates that the prescribed set of conditions would not be met, said determination is reiterated at least once for the sequentially next higher gear level, until a gear level is found at which the prescribed set of conditions would be met.

25. The method of claim 9, wherein the predicted rpm-rate is determined based on a value of an operational parameter meeting a prescribed condition, and said value is used again in a subsequent cycle of the method within a prescribed time limit.

26. A method of operating a motor vehicle with an engine producing a driving torque, a clutch, a transmission shiftable between different gear levels, at least one driven wheel, and a control unit to control how much of the driving torque is transmitted through the clutch to the at least one driven wheel; the method comprising the steps of:

a) determining a current rpm-rate of the at least one driven wheel;

b) examining the current rpm-rate for potential errors;

c) detecting whether a command for a gear shift has been initiated;

d) in case an error was found in step b), taking protective measures so that the engine cannot be forced to run at rpm-rates detrimental to the safe operation of the vehicle as a consequence of executing and completing said gear shift; and e) monitoring of the clutch for the presence of slippage phases.

27. The method of claim 26, wherein said monitoring is carried out at least part of the time dependent on the current rpm-rate of the at least one driven wheel.

28. The method of claim 26, wherein said monitoring is carried out at least part of the time substantially independent on the current rpm-rate of the at least one driven wheel.

29. A method of operating a motor vehicle with an engine producing a driving torque, a clutch, a transmission shiftable between different gear levels, at least one driven wheel, and a control unit to control how much of the driving torque is transmitted through the clutch to the at least one driven wheel; the method comprising the steps of:

a) determining a current rpm-rate of the at least one driven wheel;

b) examining the current rpm-rate for potential errors;

c) detecting whether a command for a gear shift has been initiated;

d) in case an error was found in step b), taking protective measures so that the engine cannot be forced to run at rpm-rates detrimental to the safe operation of the vehicle as a consequence of executing and completing said gear shift; and e) determining a substitute rpm-rate for at least one of an output rpm-rate of the transmission, an input rpm-rate of the transmission, and a wheel rpm-rate of the at least one driven wheel, said determination of a substitute rpm-rate being made depending on a momentary presence of prescribed conditions in accordance with a prescribed substitute rpm-rate characteristic.

30. The method of claim 29, wherein the substitute rpm-rate is at least at certain times a function of an output rpm-rate of the transmission.

31. The method of claim 29, wherein the substitute rpm-rate is at least at certain times a function of an rpm-rate of the engine.

32. The method of claim 29, wherein the substitute rpm-rate is at least at certain times assigned a value equal to a current engine-rpm rate.

33. The method of claim 29, wherein the transmission comprises operating modes "Drive" and "Manual", and wherein during time phases when the transmission is operating in one of said operating modes, the substitute rpm-rate is assigned a value substantially equal to a current engine-rpm rate.

34. The method of claim 29, wherein at a time when a command for a down-shift from a current gear into a targeted gear at least one level lower than the current gear has been detected in step c) of the method, the substitute rpm-rate is frozen at a then existing value of the substitute rpm-rate.

35. The method of claim 34, wherein the command is prevented from being executed, if at least one criterion that is a function of the frozen substitute rpm-rate has been found to be met.

36. The method of claim 34, wherein the command is prevented from being executed, if the frozen substitute rpm-rate multiplied by a transmission ratio of the targeted gear and divided by a transmission ratio of the current gear is larger than a prescribed limit.

37. The method of claim 36, wherein the command that has been prevented from being executed is replaced by a new command for a targeted new gear, so that in said new gear:

$$n_{eng,ps} = n_s \times i_{tg} / i_{cg} < n_{eng,max,tg},$$

wherein $n_{eng,ps}$ predicted post-shift rpm-rate of the engine $n_s$ substitute rpm-rate $i_{tg}$ transmission ratio of the targeted gear level $i_{cg}$ transmission ratio of the current gear level $n_{eng,max,tg}$ prescribed limit of the engine rpm-rate up to which down-shifts into the targeted gear will be accepted.

38. The method of claim 29, wherein the protective measures of step d) can be canceled at least in an indirect way.

39. The method of claim 38, wherein said indirect way comprises assigning the substitute rpm-rate a value of zero.

40. The method of claim 29, wherein the protective measures of step d) are canceled if at least on e of the conditions is met, that:
the gear shift according to the command of step c) has not been completed within a prescribed time limit; and
in step c), a command for shifting into one of the gear levels "neutral" and "reverse" has been detected.

41. The method of claim 29, wherein after a gear shift the substitute rpm-rate is maintained at a substantially constant value over a prescribed time period.

42. The method of claim 41, wherein the prescribed time period depends on prescribed conditions.

43. The method of claim 41, wherein during the prescribed time period a degree of slippage in the clutch is reduced to zero.

44. The method of claim 41, wherein after the prescribed time period the substitute rpm-rate is updated to correspond to a then current engine rpm-rate.

45. A method of operating a motor vehicle that is equipped with
an engine producing a driving torque,
at least one wheel driven by at least one driving axle,
at least one transmission arranged in a torque flow path between the engine and the at least one driving axle;
at least one clutch, arranged in the torque flow path between the engine and the at least one driving axle;
at least one control unit to control how much of the driving torque is transmitted through the clutch to the at least one driven wheel; and
an rpm-detecting device for detecting an rpm-rate of the at least one driven wheel; wherein the method comprises the steps of:
a) detecting an rpm-rate of the at least one driven wheel; and
b) monitoring the detected rpm-rate in order to determine if it contains an error, wherein if the error consists of an absence of an rpm-signal from the rpm-detecting device, a first error-classification characteristic is used to identify said absence as one of a short-time signal failure and a long-term failure of the rpm-detecting device.

46. The method of claim 45, wherein at least one kind of error is determined qualitatively.

47. The method of claim 45, wherein at least one kind of error is determined quantitatively.

48. The method of claim 45, wherein a second error-classification characteristic is used to identify said error as one of a failure of the rpm-detecting device and an error due to a wheel lock-up during a braking maneuver.

49. The method of claim 45 wherein, if an error was found in the rpm-rate, protective measures are taken so that the engine cannot be forced by a gear shift to run at rpm-rates detrimental to the safe operation of the vehicle.

50. The method of claim 45 wherein, if an error was found in the rpm-rate, alternative protective measures are taken so that the engine cannot be forced by a gear shift to run at rpm-rates detrimental to the safe operation of the vehicle, said alternative protective measures being independent of the rpm-rate that was found to be in error.

51. A method of operating a motor vehicle that is equipped with
an engine producing a driving torque,
at least one wheel driven by at least one driving axle,
at least one transmission arranged in a torque flow path between the engine and the at least one driving axle;
at least one clutch, arranged in the torque flow path between the engine and the at least one driving axle;
at least one control unit to control how much of the driving torque is transmitted through the clutch to the at least one driven wheel; and
an rpm-detecting device for detecting an rpm-rate of the at least one driven wheel; wherein the method comprises the steps of:
a) detecting an rpm-rate of the at least one driven wheel; and
b) monitoring the detected rpm-rate in order to determine if it contains an error, and
c) monitoring at least one operating parameter of the motor vehicle in order to detect an error in the rpm-rate of the at least one driven wheel.

52. The method of claim 51, wherein said error in the rpm-rate is due to a failure of the rpm-detecting device.

53. The method of claim 52, wherein the operating parameter being monitored is a time gradient of the rpm-rate of the at least one driven wheel.

54. The method of claim 51, wherein step a) includes the setting of time intervals for evaluating the rpm-rate of the at least one driven wheel.

55. The method of claim 51, wherein said detection of the rpm-rate comprises counting a number of pulses occurring during a given time interval, the frequency of the pulses being substantially dependent on the rpm-rate.

56. The method of claim 55, wherein at least one first reference value is determined for at least one first wheel rpm-rate according to at least one first wheel rpm-characteristic, if at least one pulse was counted during a prescribed time interval; and wherein at least one second reference value is determined for at least one second wheel rpm-rate according to at least one second wheel rpm-characteristic, if no pulse was counted during a prescribed time interval.

57. The method of claim 55, wherein the pulses are generated by teeth of a rotating gear passing by a sensor and, if at least one pulse occurs during the given time interval, the wheel rpm-rate n is calculated as $n=60*p/(x*T)$; p representing the number of pulses, T representing the given time interval T in seconds, and x representing the number of teeth on said gear.

58. The method of claim 55, wherein the pulses are generated by teeth of a rotating gear passing by a sensor and, if no pulse occurs during the given time interval, the wheel rpm-rate n is calculated as $n=60/(x*T)$, p representing the number of pulses, T representing the given time interval T in seconds, and x representing the number of teeth on said gear.

59. The method of claim 55, wherein the monitoring of step b) includes a determination of time gradients of the rpm-rates, and wherein a failure of the rpm-detecting device is found to be present if the time gradients of the rpm-rates between consecutive time intervals follow a predetermined pattern.

60. The method of claim 59, wherein according to said predetermined pattern a first decrease of at least 60 rpm is followed next by a decrease of at least 30 rpm and next by a decrease of at least 15 rpm.

61. The method of claim 59, wherein the predetermined pattern is used to distinguish between an error in the rpm-rate due to a failure of the rpm-detecting device and an error due to a wheel lock-up during a braking maneuver.

62. The method of claim 51, wherein at least one reference value is determined for the rpm-rate of the at least one driven wheel according to at least one wheel rpm-characteristic.

63. The method of claim 51, further comprising the step of determining whether an rpm-rate of the at least one driven wheel is implausible, wherein said step is performed by determining an actual rpm-ratio between a detected wheel-rpm rate and an actual simultaneous engine rpm-rate;

comparing said actual rpm-ratio to a theoretical rpm-ratio that should exist based on a known gear ratio in the power train between the at least one driven wheel and the engine; and identifying the rpm-rate of the at least one driven wheel as implausible if the actual rpm-ratio shows a discrepancy from the theoretical rpm-ratio that is larger than a given minimum discrepancy and lasts longer than a given minimum time period.

64. The method of claim 63 wherein, after a discrepancy in excess of the given minimum discrepancy has first been detected, said discrepancy is monitored during a prescribed continuous minimum observation interval during which the clutch is engaged and the transmission is in gear, before a plausibility determination is made in regard to said rpm-rate.

65. The method of claim 64, wherein said rpm-rate is declared plausible, if the discrepancy within an observation interval is less than a given maximum limit.

66. The method of claim 65, wherein the observation interval does not exceed the given minimum time period.

67. The method of claim 65, wherein the minimum discrepancy is equal to the maximum limit.

68. The method of claim 51 wherein, after an error has been detected in the rpm-rate, at least certain specific gear shifts in the transmission are blocked from being executed.

69. The method of claim 68, wherein the blocking of the certain gear shifts is canceled if the rpm-rate found in error has been replaced by a plausible substitute rpm-rate.

70. The method of claim 51 wherein, after an error has been detected in the rpm-rate, the rpm-rate found to be in error is replaced by a substitute rpm-rate according to a prescribed characteristic.

71. The method of claim 51 wherein, after an error has been detected in at least one predetermined rpm-rate, a failure flag is set.

72. A method of operating a motor vehicle that is equipped with an engine producing a driving torque, at least one wheel driven by at least one driving axle, at least one transmission arranged in a torque flow path between the engine and the at least one driving axle;

at least one clutch, arranged in the torque flow path between the engine and the at least one driving axle;

at least one control unit to control how much of the driving torque is transmitted through the clutch to the at least one driven wheel; and an rpm-detecting device for detecting an rpm-rate of the at least one driven wheel; wherein the method comprises the steps of:

a) detecting an rpm-rate of the at least one driven wheel; and b) monitoring the detected rpm-rate in order to determine if it contains an error, wherein after an error has been detected in at least one predetermined rpm-rate, a failure flag is set, wherein if a failure flag has been set, all gear shifts in the transmission are blocked from being executed.

73. The method of claim 72, wherein the blocking of predetermined individual gear shifts is canceled if prescribed conditions are met.

74. The method of claim 73, wherein said prescribed conditions are designed to assure that the engine cannot be forced by a gear shift to run at rpm-rates detrimental to the safe operation of the vehicle.

75. The method of claim 73, wherein said prescribed conditions are designed to assure that a traveling speed of the vehicle is so slow that the engine cannot be forced even by a shift into first gear to run at rpm-rates detrimental to the safe operation of the vehicle.

76. The method of claim 73, wherein the prescribed conditions comprise:

a first condition that the engine is running at an engine rpm-rate slower than a prescribed threshold rpm-rate;

a second condition that the clutch is substantially in full engagement; and a third condition that a gear level of the transmission is engaged.

77. The method claim 76, wherein the threshold value is prescribed so that $n_{eng} < n_{threshold} \times i_1/i_5 < n_{eng,max}$, where $n_{eng}$ stands for the engine rpm-rate, nthreshold stands for the threshold rpm-rate, $i_1$ stands for the transmission ratio in first gear, $i_5$ stands for the transmission ratio in fifth gear, and $n_{eng,max}$ stands for the maximum permissible rpm-rate of the engine.

78. The method claim 72, further comprising the steps of:

c) detecting whether a command for a gear shift has been initiated;

d) detecting whether the clutch has been substantially disengaged longer than a prescribed time period;

e) detecting whether the transmission is operating in the neutral gear level; and f) if at least one of the conditions d) and e) is met, executing the command by shifting through a predetermined descending order of consecutive gear levels until the gear level targeted by the command has been reached.

79. The method of claim 78 wherein in step f) said predetermined descending order of consecutive gear levels starts with the highest gear level of the transmission.

80. The method of claim 78 wherein in step f) said predetermined descending order of consecutive gear levels starts with a gear level that is not the highest gear level of the transmission.

81. A method of operating a motor vehicle that is equipped with an engine producing a driving torque, at least one wheel driven by at least one driving axle, at least one transmission arranged in a torque flow path between the engine and the at least one driving axle;

at least one clutch, arranged in the torque flow path between the engine and the at least one driving axle;

at least one control unit to control how much of the driving torque is transmitted through the clutch to the at least one driven wheel; and an rpm-detecting device for detecting an rpm-rate of the at least one driven wheel; wherein the method comprises the steps of:
- a) detecting an rpm-rate of the at least one driven wheel;
- b) monitoring the detected rpm-rate in order to determine if it contains an error;
- c) detecting whether a command for a gear shift has been initiated;
- d) detecting whether certain prescribed conditions are met; and
- e) if said prescribed conditions are met, executing the command by shifting through a predetermined descending order of consecutive gear levels until the gear level targeted by the command has been reached.

82. A method of operating a motor vehicle, comprising the steps of:
- a) determining whether the vehicle is moving in relation to a road pavement;
- b) if the vehicle is moving, determining whether a driven wheel of the vehicle is not in a state of pure rolling motion in relation to the pavement;
- c) determining a maximum value that an rpm-difference between driven wheels of the vehicle cannot exceed as long as said driven wheels are in a state of pure rolling motion in relation to the pavement; and
- d) determining that not all wheels of the vehicle are in a state of pure rolling motion, if the rpm-difference of two driven wheels exceeds said maximum value.

83. The method of claim 82, wherein said maximum value is dependent on the minimum turning radius of the vehicle.

84. The method of claim 82, wherein said maximum value is determined by the formula:

$$\Delta n_{\max} = \frac{900 \times F_c \times w}{\pi^2 \times m \times r_w^2 \times i_d \times i_t \times n_e}$$

wherein the symbols have the following meanings:

$\Delta n_{max}$ maximum value of the rpm-difference $F_c$ maximum centrifugal force on the vehicle w track width of the vehicle m vehicle mass $r_w$ wheel radius $i_d$ ratio of the differential $i_t$ ratio of the transmission $n_e$ rpm-rate of the engine,

- b) if the vehicle is moving, determining whether a driven wheel of the vehicle is not in state of pure rolling motion in relation to the pavement;
- c) determining a maximum value that an rpm-difference between driven wheels of the vehicle cannot exceed as long as said driven wheels are in a state of pure rolling motion in relation to the pavement; and
- d) determingin that not all wheels of the vehicle are in a state of pure rolling motion, if the rpm-difference of two driven wheels exceeds said maximum value.

85. A method of operating a motor vehicle with at least one rpm sensor operable to detect rpm-rates of at least one vehicle wheel, said method comprising the steps of:
- a) detecting at least one of said rpm-rates:
- b) analyzing the detected rpm-rate to determine whether said detected rpm-rate deviates from a prescribed functional relationship between rpm-rate and vehicle speed, wherein step b) further serves to determine at least one operational parameter of the vehicle and wherein said at least one operational parameter is a degree of clutch slippage.

86. The method of claim 85, wherein the detected rpm-rate is ignored in the determination of said operating parameter, if said detecting step occurred while not all of the wheels were in a state of pure rolling motion.

* * * * *